United States Patent [19]
Stuhldreher

[11] Patent Number: 6,080,809
[45] Date of Patent: *Jun. 27, 2000

[54] KAOLIN CLAY IN SILICA TREAD COMPOUNDS TECHNICAL FIELD

[75] Inventor: Terrence Michael Stuhldreher, Wadsworth, Ohio

[73] Assignee: Bridgestone/Firestone, Inc., Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,964

[22] Filed: Jul. 30, 1997

[51] Int. Cl.$^7$ ............................... C08K 3/34; C08K 3/36; C08K 3/04
[52] U.S. Cl. ........................ 524/447; 524/492; 524/493; 524/495; 524/496; 524/261; 152/209 RR
[58] Field of Search ..................................... 524/447, 492, 524/495; 152/209 RR

[56] References Cited

U.S. PATENT DOCUMENTS

| | | |
|---|---|---|
| 4,522,970 | 6/1985 | Scriver et al. |
| 5,580,919 | 12/1996 | Agostini et al. .................. 524/447 |
| 5,672,639 | 9/1997 | Corvasce et al. .................. 152/450 |

FOREIGN PATENT DOCUMENTS

| | | |
|---|---|---|
| 0 655 480 A2 | 11/1994 | European Pat. Off. |
| 0 697 432 A1 | 8/1995 | European Pat. Off. |
| 0 732 362 A1 | 3/1996 | European Pat. Off. |
| XP 000698112 | 5/1997 | Germany |

*Primary Examiner*—Tae Yoon
*Attorney, Agent, or Firm*—John H. Hornickel; Frank J. Troy, Sr.; Laura F. Shunk

[57] ABSTRACT

The invention relates to a method for decreasing dynamic modulus without decreasing hardness in silica tread compounds in tires made in accordance with this method. The tread composition comprises an elastomer including a performance-enhancing package comprising silica, carbon black and a silica replacement. The replacement replaces up to about 40 percent by weight of the silica and yet maintains one or more selected performance properties as if the performance enhancement package were pure carbon black and silica. The replacement is kaolin clay present in conjunction with a silane coupling agent. In the method of the present invention kaolin clay is used as a replacement for about 5 to about 20 parts, by weight, of silica in the compounding of silica tread compounds.

14 Claims, No Drawings

KAOLIN CLAY IN SILICA TREAD COMPOUNDS TECHNICAL FIELD

TECHNICAL FIELD

The invention relates to a method for decreasing dynamic modulus without decreasing hardness so as to improve ride quality while maintaining wet and dry handling characteristics, in silica tread compounds and tires generally for passenger vehicles made in accordance with this method. The present invention also relates to the composition made by this method. This result is achieved by using a kaolin clay as a partial replacement for silica in a performance-enhancing system added to the silica tread compounds.

BACKGROUND ART

The object of the present invention is to provide a tread rubber composition having a base tread rubber combined with a system or package of performance-enhancing agents comprising silica, coupling agent, carbon black, and kaolin clay.

A wide variety of factors are taken into consideration in the art and science of formulating tire tread compositions. For example, the tires are formulated to achieve specific wet and dry handling characteristics, provide traction under snowy conditions, resist abrasion, and provide a quiet, comfortable ride while achieving suitable tire wear. Performance-enhancing agents are added to the base elastomer to help achieve the desired characteristics. Sometimes combinations of such agents can act synergistically and can function unexpectedly in collaboration.

It has been customary in the past to incorporate silica in tire tread compositions as a filler and also to enhance the performance characteristics of the tire, such as low rolling resistance, while improving adherence to wet and snow-covered ground, improving wear and aging properties while reducing noise.

While numerous patents relate to the state of the art with respect to the base polymer for tire treads, U.S. Pat. No. 5,227,425, to Rauline, relates more specifically to all-season, high-performance tires utilizing a specific type of silica to improve performance characteristics of the tires.

U.S. Pat. No. 4,522,970, to Scriver et al., is an example of a patent relating to sulfur cured, rubber tread compositions formulated to meet certain defined performance characteristics.

The present invention relates to a method of achieving unexpected stress/strain characteristics in tread compositions so as to reduce the low strain modulus of a tire tread without reducing the hardness or high strain modulus to the same degree. This contrasts with the customary relationship between these characteristics. More specifically, the compositions maintain wet and dry handling, abrasion resistance, and snow traction of a silica tread compound while improving ride comfort and impact damping.

The present invention is particularly suitable for tire treads intended for passenger cars, all-terrain vehicles, pick-up trucks, and motorcycles.

The above objects are met by the partial replacement of silica with a kaolin clay in conjunction with a silane coupling agent as a performance-enhancing system in an elastomeric tread composition.

In the method of the present invention low strain modulus is reduced without reducing the hardness or high strain modulus to the same degree in silica tread compounds by replacing from about 20 to about 40% of the total silica with an equal amount of kaolin clay to result in a performance-enhancing package of about 5 to 20 parts by weight of clay, about 20–50 parts by weight of a high structure, high surface area silica which preferably includes a silane coupling agent, and about 0–60 parts of highly structured, tread-grade carbon black, all per 100 parts of base elastomeric composition.

DETAILED DESCRIPTION OF THE INVENTION

In accordance with the present invention, this performance-enhancing system can be used with various tread compositions. Such tread compositions are primarily based upon a mixture of natural rubber, styrene butadiene rubber, and butadiene rubber and/or blends thereof.

The kaolin clay of the present invention is also known as hydrated aluminum silicate and can be air-floated or water-washed (having a median particle size of from about 0.2 microns). The kaolin clay is substituted on a 1:1 weight basis for from about 20 to about 40 percent of the silica. More broadly, the kaolin clay may be provided in a weight ratio of from 0.1:1 to 1:1 parts by weight, and preferably 0.2:1 to 0.4:1 part by weight, of clay to silica.

The kaolin clay is enhanced by the presence of a silane coupling agent which is for example Bis(3-triethoxysilylpropyl)-tetrasulfane (such as sold under the name Si69® from Degussa). The coupling agent may be reacted in situ with the clay (as well as the silica), although alternatively clay pretreated with the coupling agent may be used. The coupling agent is provided for the clay at the same ratio that it is provide for the silica, i.e., from about 6 to 12 weight percent of the silica.

Silica is also used in the high-performance package and it includes high-structure, high surface area silica, i.e., having a nitrogen surface area of from about 190 to about 220 $m^2/g$, for a total of not more than about 50 parts; i.e. from about 20 to about 50 parts; preferably not more than about 45 parts; i.e. from about 25 to about 45 parts; and most preferably not more than about 40 parts; i.e. from about 30 to about 40 parts of silica; all parts based on 100 parts of base rubber.

Carbon black is also used: preferably high structured, tread-grade carbon black at from 0–60; preferably 15–45; and most preferably 35 to 40 parts, all parts based on 100 parts of base rubber.

In accordance with the present invention specific mixing sequences follow in which the first step rubber and silica are mixed with the carbon black and the clay at a temperature of from about 300° F. to about 390° F. and preferably about 320° F. to about 380° F., i.e., a relatively high temperature. In a second stage, coupling agent is added and the temperature is held between about 260° F. and about 300° F. for mixing and to react the coupling agent with the silica and the kaolin clay, which temperature is held below the cross-linking initiation temperature. In an optional third stage, the compound is re-melted at a temperature of from about 220° F. to about 260° F. to improve the processing. In the final stage, curatives are introduced and mixing continues at a temperature of about 180° F. to about 220° F. The mixing occurs in an internal mixer such as a Banbury® or Intermix®.

EXAMPLES

In accordance with this invention, two rubber tread compositions were compounded having the formulas listed in Table I. Specifically, the rubber and silica were mixed at the percentages listed in the control and with kaolin clay in the parts listed under Formula A at a temperature of about 340° F. In a second stage, the silane coupling agent was added and the temperature was held at about 290° to react the coupling agent respectively with the silica or the kaolin clay. The oil and carbon black were added in the first stage. In the final stage, state-of-the-art sulphur cure system was used at a typical ratio at a temperature of about 190° F. The parts are listed in the Table so that the pertinent ingredients are based on 100 parts of rubber as is known to those skilled in the art of rubber compounding. The additional components above 100 are components which are not rubber, such as extenders, fillers, and the like.

In a second example, a different tread composition was formulated in accordance with Table II corresponding to the process described for Example 1. Once again, kaolin clay was added to Sample B and omitted from the control. The amount of the silane added in both systems was the same relative to the amount of silica; however, since there was less silica in the samples, the cumulative amount of silane was lower. It is believed that this lower amount is still effective since the clay has smaller surface area than the amount of silica which it replaces, i.e. enough residual silane coupling agent is present to also couple the kaolin clay in the system.

After compounding, appropriate test specimens were formed of the compositions and physical properties were tested for Examples 1 and 2. With respect to the test, the low strain modulus was considered herein to be 0 to 25 percent deflection, while the high strain modulus is 100 percent or greater deflection. The results of these tests are set forth in Tables III and IV. Test equipment and methods are listed in Table V. The test results for the controls were normalized to 100 and the test data normalized to show improvement as a higher number relative to the control. The Tables indicate improvement in dynamic modulus, tangent delta, 5 percent modulus, while maintaining a relatively similar, or better 300 percent modulus and Shore-A Durometer hardness. An unexpected rolling loss improvement was demonstrated which results in a projected fuel economy for the tire vehicle system. Moreover, there was some improvement in snow and ice traction demonstrated at the dynamic modulus at −20° C. for Example 1.

TABLE I

| FORMULA 1 | CONTROL | EXAMPLE A |
|---|---|---|
| Solution SBR High Styrene | *90.75 | *90.75 |
| High-Cis BR | 25.0 | 25.0 |
| N110 Carbon Black | 41 | 41 |
| Silica | 40 | 30 |
| Kaolin Clay | — | 10 |
| Silane | 8 | 6 |
| Oil | 25.5 | 25.5 |
| Zinc Oxide | 1.7 | 1.7 |
| Stearic Acid | 1 | 1 |
| Wax | 1.5 | 1.5 |
| Antiozonant | 0.95 | 0.95 |

*The SBR ingredient is a total weight including 15.75 weight parts of extended oil, so that the amount of SBR was 75 parts.

TABLE II

| FORMULA 2 | CONTROL | EXAMPLE B |
|---|---|---|
| Solution SBR Medium Styrene | *27.5 | *27.5 |
| Solution SBR High Vinyl | 45 | 55 |
| Natural Rubber | 35 | 25 |
| Carbon Black | 35 | 35 |
| Silica | 35 | 25 |
| Kaolin Clay | — | 10 |
| Silane | 7 | 5 |
| Oil | 7.5 | 7.5 |
| Zinc Oxide | 3 | 3 |
| Stearic Acid | 1 | 1 |
| Wax | 1.5 | 1.5 |
| Antiozonant | 0.95 | 0.95 |

*The SBR ingredient is a total weight including 7.5 parts of extended oil so that the amount of this SBR was 20 parts.

TABLE III

ZR277 Data - Normalized

| Physical Property | Control | Test | Predictor |
|---|---|---|---|
| Dynamic Modulus @ 25° C. | 100 | 139 | Ride comfort |
| Tangent Delta @ 50° C. | 100 | 109 | Rolling loss |
| 5% Modulus | 100 | 120 | Ride comfort |
| 300% Modulus | 100 | 101 | Handling |
| Shore "A" Durometer Hardness | 100 | 96 | Handling |
| Dynamic Modulus at −20° | 100 | 115 | Snow/Ice Traction |

TABLE IV

ZR827 Data - Normalized

| Physical Property | Control | Test | Predictor |
|---|---|---|---|
| Dynamic Modulus @ 25° C. | 100 | 130 | Ride comfort |
| Tangent Delta @ 50° C. | 100 | 118 | Rolling loss |
| 5% Modulus | 100 | 115 | Ride comfort |
| 300% Modulus | 100 | 94 | Handling |
| Shore "A" Durometer Hardness | 100 | 96 | Handling |
| Dynamic Modulus at −20° C. | 100 | 116 | Snow/Ice Traction |

TABLE V

Test Equipment & Methods

DYNAMIC MODULUS @ 25° C.
TANGENT DELTA @ 50° C.

Measured on MTS Elastomer Test System Model 830
5% Deflection @ 10 Hz
5% MODULUS Measured on Instron Model 4465
300% MODULUS Measured on Instron Model 4400
DUROMETER In accordance with ASTM D2240-95
DYNAMIC MODULUS @ −20° C.

Rheometrics Dynamic Analyzer Model RDA II
0.1% Strain @ 10 Hz

While in accordance with the patent statutes the best mode and preferred embodiment has been set forth, the scope of the invention is not limited thereto, but rather by the scope of the attached claims.

What is claimed is:

1. A method for reducing low strain modulus without reducing hardness and high strain modulus to the same extent of a silica tread compound comprising the steps of preparing a base tread composition and adding a performance-enhancing system comprising 15 to about 60 parts of high-structure, tread-grade carbon black, about 20 to 50 parts of high-structure, high surface area silica, and about 5 to about 20 parts of kaolin clay and silane coupling agent, the coupling agent being from about 6 to about 12 weight percent of the kaolin clay and silica, all parts being based on 100 parts of base tread composition.

2. The method of claim 1, wherein the kaolin clay is present at a weight ratio of from about 0.1 to about 1 part per part of silica.

3. The method of claim 2, wherein the kaolin clay is present at a weight ratio of from about 0.2 to about 0.5 part per part of silica.

4. The method of claim 1, wherein said base tread composition comprises one or more of polybutadiene, styrene butadiene rubber, and natural rubber.

5. The method of claim 4, wherein said base tread composition comprises from 0 to about 50 parts of polybutadiene, about 5 to about 100 parts styrene butadiene rubber, and 0 to about 40 parts of natural rubber.

6. The method of claim 5, comprising from about 10 to about 50 parts of high cis-butadiene and from about 50 to about 90 parts of high styrene styrene butadiene rubber.

7. The method of claim 1, wherein said base tread composition comprises about 10 to about 50 parts medium styrene styrene butadiene rubber, from about 1 5 to about 60 parts of high vinyl styrene butadiene rubber, and from about 5 to about 40 parts of natural rubber.

8. A silica tread compound comprising a base rubber composition and a performance-enhancing system comprising 15 to about 60 parts of high-structure, tread-grade, carbon black, about 20 to about 50 parts of high-structure, high surface area silica, and about 5 to about 20 parts of kaolin clay and silane coupling agent, the coupling agent being from about 6 to about 12 weight percent of the kaolin clay and silica, all parts being based on 100 parts of base rubber composition.

9. A silica tread compound according to claim 8, wherein the kaolin clay is present at a weight ratio of from about 0.1 to about 1 part per part of silica.

10. A silica tread compound according to claim 9, wherein the kaolin clay is present at a weight ratio of from about 0.2 to about 0.5 part per part of silica.

11. A silica tread compound according to claim 8, wherein said base tread composition comprises one or more of polybutadiene, styrene butadiene rubber, and natural rubber.

12. A silica tread compound according to claim 11, wherein said base thread composition comprises from 0 to about 50 parts of polybutadiene, about 5 to about 100 parts styrene butadiene rubber, and 0 to about 40 parts of natural rubber.

13. A silica tread compound according to claim 11, wherein said base thread composition comprises from about 10 to about 50 parts of high cis-butadiene and from about 50 to about 90 parts of high styrene styrene butadiene rubber.

14. A silica tread compound according to claim 11, comprising about 10 to about 50 parts of medium styrene styrene butadiene rubber, from about 15 to about 60 parts of high vinyl styrene butadiene rubber, and from about 5 to about 40 parts of natural rubber.

\* \* \* \* \*